US008831842B2

(12) United States Patent
Dufford

(10) Patent No.: US 8,831,842 B2
(45) Date of Patent: Sep. 9, 2014

(54) HYBRID VEHICLE AUTOMATIC SIMULATED SHIFTING

(71) Applicant: Toyota Motor Engineering & Manufacturing North America, Inc., Erlanger, KY (US)

(72) Inventor: Mohammad E. Dufford, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/744,122

(22) Filed: Jan. 17, 2013

(65) Prior Publication Data
US 2014/0200777 A1 Jul. 17, 2014

(51) Int. Cl.
*G06F 7/00* (2006.01)
*B60W 10/06* (2006.01)
*B60W 20/00* (2006.01)

(52) U.S. Cl.
CPC ..................... *B60W 20/30* (2013.01)
USPC .............. 701/54; 701/53; 701/22; 180/65.28; 180/65.285; 477/27; 477/29

(58) Field of Classification Search
CPC .............................. B60W 20/30; B60W 20/40
USPC .............. 180/65.27, 65.28, 65.285; 381/432; 477/4, 5, 15, 27, 29; 701/22, 53, 54; 903/902, 947
See application file for complete search history.

(56) References Cited

U.S. PATENT DOCUMENTS

| | | | |
|---|---|---|---|
| 4,701,750 A | 10/1987 | Wilkinson et al. | |
| 5,189,908 A * | 3/1993 | Sano et al. ................. | 73/118.02 |
| 5,249,458 A * | 10/1993 | Sano et al. ................. | 73/118.02 |
| 5,366,376 A | 11/1994 | Copperman et al. | |
| 5,635,903 A | 6/1997 | Koike et al. | |
| 5,915,801 A * | 6/1999 | Taga et al. ...................... | 903/945 |
| 6,033,338 A * | 3/2000 | Jackson et al. .................. | 477/44 |
| 6,725,150 B1 | 4/2004 | Glandian | |
| 7,501,934 B2 | 3/2009 | Tischer | |
| 7,736,267 B2 * | 6/2010 | Kaya et al. ..................... | 477/111 |
| 7,764,800 B2 | 7/2010 | Maeda | |
| 7,787,633 B2 | 8/2010 | Costello et al. | |
| 8,059,829 B2 | 11/2011 | Kobayashi et al. | |
| 8,179,234 B1 | 5/2012 | Atwood | |
| 2001/0032040 A1 * | 10/2001 | Albert et al. ..................... | 701/22 |
| 2006/0195242 A1 * | 8/2006 | Yamamoto et al. ............. | 701/51 |
| 2010/0089307 A1 | 4/2010 | Kenchington | |
| 2010/0208915 A1 | 8/2010 | Lipp | |
| 2010/0246843 A1 | 9/2010 | Palmestal | |
| 2011/0010269 A1 | 1/2011 | Ballard | |
| 2011/0093149 A1 | 4/2011 | Tanaka | |
| 2011/0277577 A1 * | 11/2011 | Roberge et al. .............. | 74/473.1 |
| 2012/0106748 A1 | 5/2012 | Peachey et al. | |

* cited by examiner

*Primary Examiner* — Helal A Algahaim
*Assistant Examiner* — Donald J Wallace
(74) *Attorney, Agent, or Firm* — Snell & Wilmer LLP

(57) ABSTRACT

A system for simulated shifting for a hybrid vehicle, the system includes a plurality of wheels, an engine, a sensor, a transmission, a memory for storing target engine speeds and deceleration torques for a plurality of simulated gears, and a processor. The engine provides a torque to the plurality of wheels. The sensor detects a requested deceleration torque. The transmission simulates a current simulated gear by delivering an applied torque, which corresponds to the requested deceleration torque, to the plurality of wheels and an engine speed corresponding to the simulated gear. The processor simulates a downshift by increasing an engine speed of the engine without changing the applied torque to the plurality of wheels when the requested deceleration torque exceeds a deceleration torque of a lower simulated gear.

20 Claims, 7 Drawing Sheets

HYBRID VEHICLE AUTOMATIC SIMULATED SHIFTING

BACKGROUND

1. Field

The present application relates to a hybrid vehicle automatic simulated shifting, which simulates engine sounds at shift points anticipated by the driver.

2. Description of the Related Art

Hybrid vehicles have improved fuel economy over conventional automobiles through the efficient use of two or more power sources. Hybrid vehicles can utilize a power split architecture, which includes an engine and electric motor-generators having separate power paths to independently provide power to the wheels. However, a step transmission used in conventional automobiles is unsuitable for transmitting power from both the engine and the motor-generators to the wheels. Instead, hybrid vehicles can employ an electrically controlled variable transmission (ECVT).

Unlike a conventional step transmission, an ECVT does not select from fixed gear ratios, or gears. An ECVT utilizes a planetary gear, the motor-generators, and control circuitry to adjust the spin rate of the engine. This allows the ECVT to control the engine speed independently of the vehicle speed. The engine speed has no direct relation to the vehicle's acceleration or speed. However, drivers are accustomed to conventional step transmissions where the engine speed is linked to the gears.

With a step transmission, the engine speed increases as the vehicle accelerates. The increasing engine speed generates noise, which serves as an audible cue for drivers to shift gears. Drivers also associate the engine noise with power and performance. The acceleration is interrupted when shifting gears, which drivers are also accustomed to. Because an ECVT has no fixed gears, and further modulates the engine speed with the motor-generator output, hybrid vehicles do not produce the same engine flares while accelerating. The ECVT also provides for smooth acceleration, with no jerks related to shifting gears. Hybrid vehicles may feature a sequential gear logic, which provides simulated gears. Paddle shifters allow drivers to manually shift to the simulated gears. The sequential gear logic further provides automatic upshifting. However, the sequential gear logic does not provide for automatic downshifting. Drivers seeking a sporty driving experience lose the engine sounds associated with downshifting a conventional step transmission.

Thus, there is a need for a hybrid vehicle which enhances driver experience by automatically simulating downshifts as anticipated by the driver.

SUMMARY

The present application relates to a hybrid vehicle which automatically simulates downshifting to provide a more sporty driving experience. One aspect of the present application is to provide a hybrid vehicle which produces engine sound to simulate aggressive downshifting. Another aspect of the present application is to provide a hybrid vehicle that automatically shifts to lower simulated gears with higher engine speed during braking for a high response during re-acceleration.

In one implementation, the hybrid vehicle includes a plurality of wheels, an engine for providing a torque to the plurality of wheels, and a sensor configured to detect a requested deceleration torque. The hybrid vehicle also includes a transmission coupled to the engine and the plurality of wheels that is configured to simulate a current simulated gear and deliver an applied torque to the plurality of wheels, the applied torque corresponding to the requested deceleration torque, a memory for storing a deceleration torque and target engine speed for each of a plurality of simulated gears, and a processor coupled to the engine, the sensor, the transmission, and the memory, the processor configured to increase an engine speed of the engine without changing the applied torque to the plurality of wheels when the requested deceleration torque exceeds a deceleration torque of a lower simulated gear.

In another implementation, the hybrid vehicle includes a plurality of wheels, an engine for providing a torque to the plurality of wheels, and a brake pedal sensor configured to detect a pressure being applied to a brake pedal, the pressure being applied to the brake pedal corresponding to a requested deceleration torque. The hybrid vehicle also includes a transmission coupled to the engine and the plurality of wheels and configured to simulate a current simulated gear and deliver an applied torque to the plurality of wheels, the applied torque corresponding to the requested deceleration torque, a memory for storing a deceleration torque and target engine speed for each of a plurality of simulated gears, a processor coupled to the engine, the brake pedal sensor, the transmission, and the memory, the processor configured to simulate a downshift for each simulated gear lower than the current simulated gear having a deceleration torque exceeded by the requested deceleration torque, and a paddle shifter configured for manual simulated shifting.

In yet another implementation, the present application provides a method for simulating shifting for a hybrid vehicle including simulating a current simulated gear, sensing a requested deceleration torque, delivering an applied torque corresponding to the requested deceleration torque, and increasing an engine speed without changing the applied torque when the requested deceleration torque exceeds a deceleration torque of a lower simulated gear.

BRIEF DESCRIPTION OF THE DRAWINGS

The features, obstacles, and advantages of the present application will become more apparent from the detailed description set forth below when taken in conjunction with the drawings, wherein.

DETAILED DESCRIPTION

Apparatus, systems and methods that implement the implementations of the various features of the present application will now be described with reference to the drawings. The drawings and the associated descriptions are provided to illustrate some implementations of the present application and not to limit the scope of the present application. Throughout the drawings, reference numbers are re-used to indicate correspondence between referenced elements.

Figure 1:
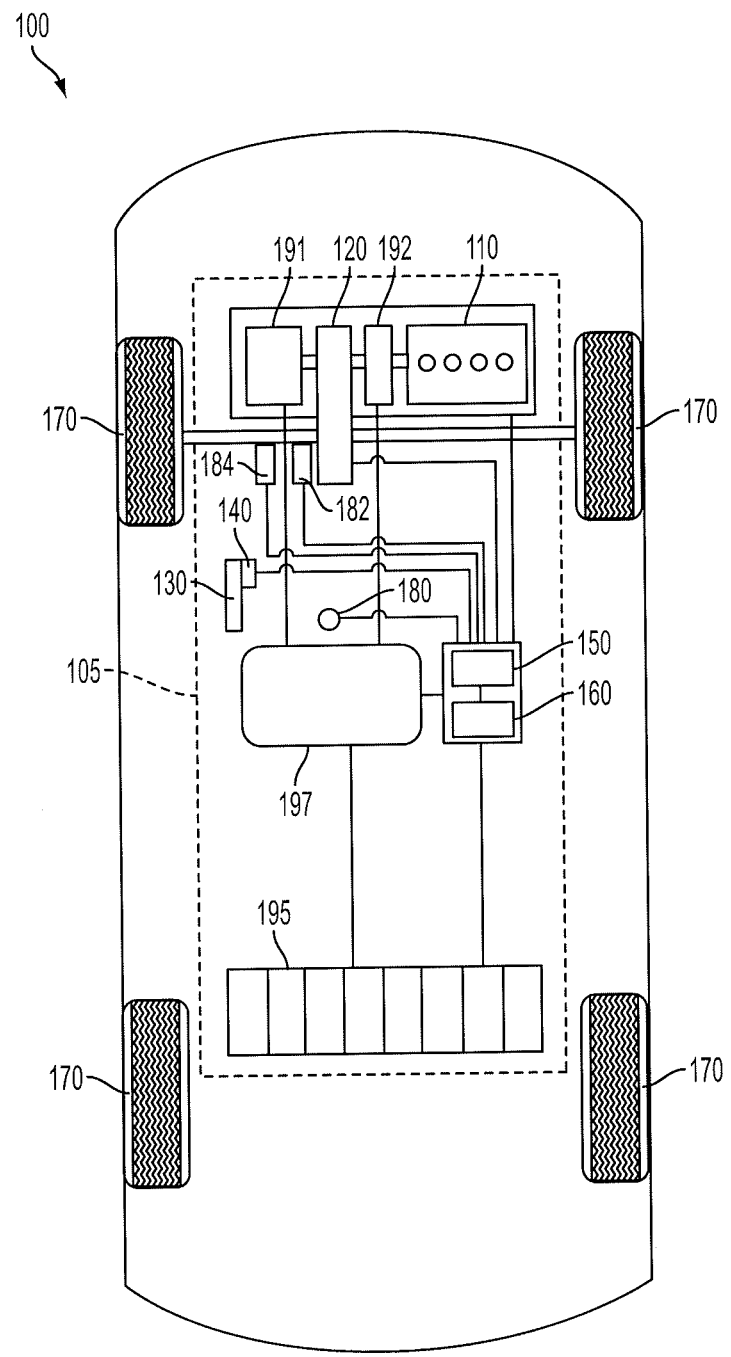
FIG. 1 is a diagram of a hybrid vehicle including an engine and transmission according to an implementation of the present application.

In one implementation, the present application includes a hybrid vehicle 100 as shown in FIG. 1. The hybrid vehicle 100 can include drive force unit 105 and wheels 170. Drive force unit 105 further includes an engine 110, an electric motor-generator 191, an electric motor-generator 192, a battery unit 195, an inverter box 197, a brake pedal 130, a brake pedal sensor 140, a transmission 120, a memory 160, a processor 150, a paddle shifter 180, a speed sensor 182, and an accelerometer 184.

The engine 110 primarily drives the wheels 170. The engine 110 can be an internal combustion engine. The internal combustion engine can combust fuel, such as gasoline, ethanol, diesel, biofuel, or other types of fuels which are suitable for combustion. The torque output by the engine 110 is received by the transmission 120. The electric motor-generators 191 and 192 can also output torque to the transmission 120. The engine 110 and the electric motor-generators 191 and 192 may be coupled through a planetary gear (not shown in FIG. 1). The transmission 120 delivers an applied torque to the wheels 170. The torque output by the engine 110 does not directly translate into the applied torque to the wheels 170.

The electric motor-generators 191 and 192 can serve as motors which output torque in a drive mode, and can serve as generators to recharge the battery unit 195 in a regeneration mode. The electric power delivered from or to the electric motor-generators 191 and 192 passes through inverter box 197 to the battery unit 195. The brake pedal sensor 140 can detect pressure applied to the brake pedal 130, which may further affect the applied torque to the wheels 170. The speed sensor 182 is connected to an output shaft of the transmission 120 to detect a speed input which is converted into a vehicle speed by processor 150. The accelerometer 184 is connected to the body of hybrid vehicle 100 to detect the actual deceleration of hybrid vehicle 100, which corresponds to a deceleration torque.

The transmission 120 is a transmission suitable for a hybrid vehicle. The transmission 120 can be an ECVT, which is coupled to the engine 110 as well as the electric motor-generators 191 and 192. The transmission 120 can deliver torque output from a combination of the engine 110 and the electric motor-generators 191 and 192. The processor 150 controls the transmission 120, utilizing data stored in memory 160 to determine the applied torque delivered to the wheels 170. For example, the processor 150 may determine that at a certain vehicle speed, the engine 110 should provide a fraction of the applied torque to the wheels while the electric motor-generator 191 provides most of the applied torque. The processor 150 and the transmission 120 can control an engine speed of the engine 110 independently from the vehicle speed.

Figure 2A:
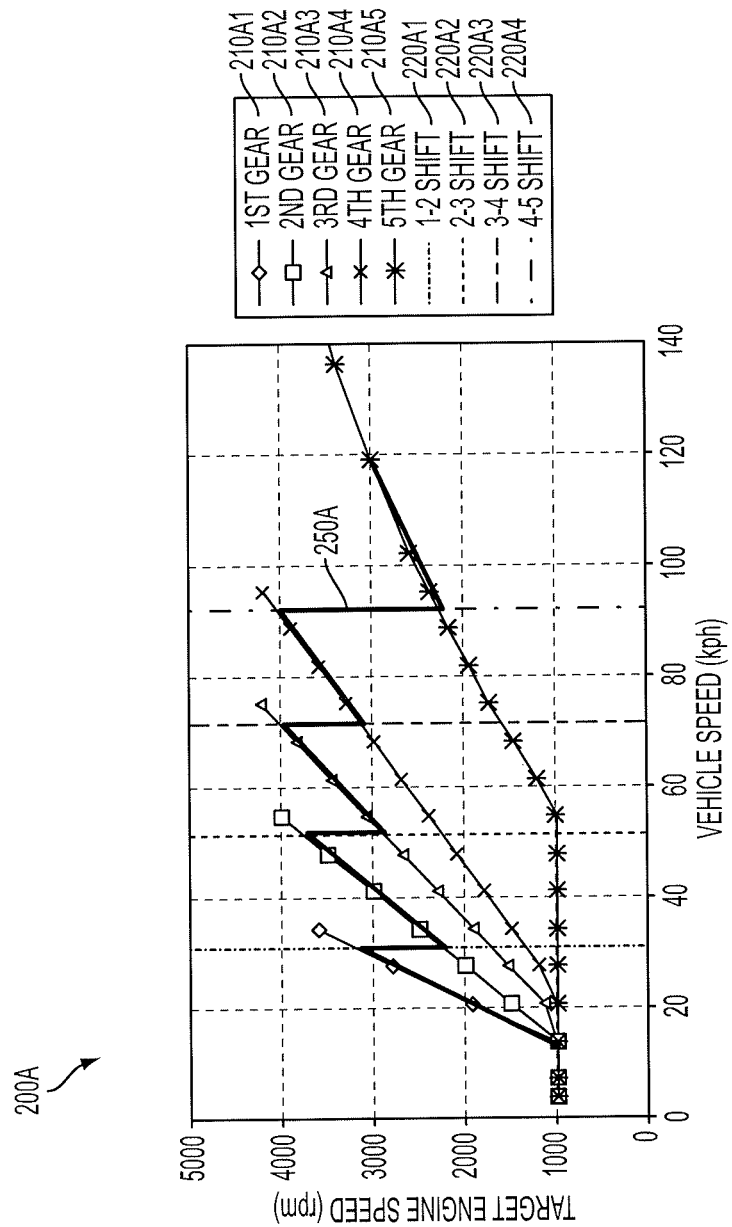
FIGS. 2A-2B are target engine speed and deceleration torque maps which map simulated gears and shift points based on vehicle speed according to an implementation of the present application.
Figure 2B:
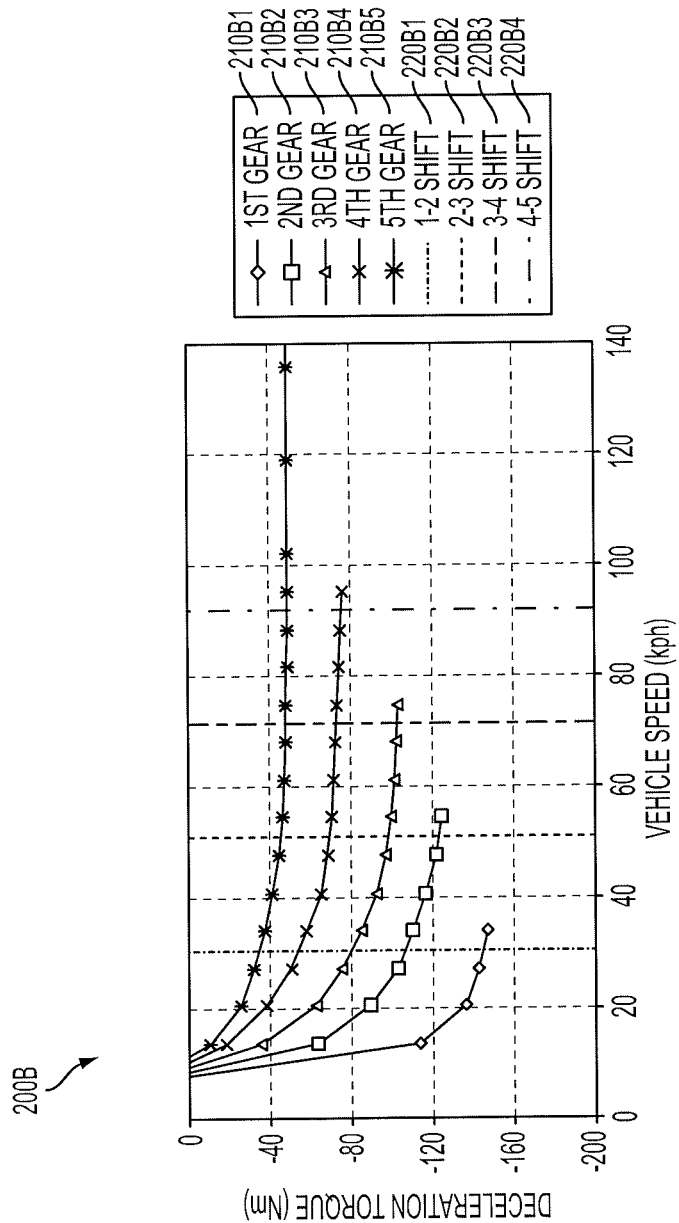

Because the transmission 120 controls the torque delivered from more than one power source, the transmission 120 does not have fixed gear ratios, or gears, as a conventional step transmission would. Processor 150 can simulate gears and simulate shifting gears. Memory 160 stores target engine speed and deceleration torque maps, which contain simulated shift points. The processor 150 can automatically simulate shifts, using target engine speed and deceleration torque maps stored in memory 160. Alternatively, the driver may use the paddle shifter 180, coupled to the processor 150, to manually simulate shifting. FIGS. 2A-2B illustrate target engine speed and deceleration torque maps similar to those stored in memory 160.

Target engine speed map 200A in FIG. 2A shows the target engine speed in revolutions per minute (rpm) for each simulated gear along the y axis versus vehicle speed in kilometers per hour (kph) along the x axis. These target engine speeds follow a roughly linear relationship to vehicle speed to simulate conventional step transmission behavior. A simulated shift point corresponds to the vehicle speed at which a step transmission would shift gears. However, the vehicle speeds for the simulated shift points may differ from the vehicle speeds for a step transmission's shift points. FIG. 2A illustrates the simulated shift points for upshifting a hybrid vehicle. In this implementation, the first simulated shift point 220A1 is approximately 30 kph, the second simulated shift point 220A2 is approximately 50 kph, the third simulated shift point 220A3 is approximately 70 kph, and the fourth simulated shift point 220A4 is approximately 90 kph.

The simulated gears are represented by the first simulated gear 210A1, the second simulated gear 210A2, the third simulated gear 210A3, the fourth simulated gear 210A4, and the fifth simulated gear 210A5. A simulated gear corresponds to the target engine speed for a given vehicle speed if the hybrid vehicle were using that gear. For example, if the hybrid vehicle 100 was traveling at approximately 40 kph in second gear, the engine speed would be approximately 3000 rpm.

The hybrid vehicle 100 may be configured to automatically shift between the simulated gears. The automatic shift curve 250A in FIG. 2A illustrates automatic shifting from the first simulated gear 210A1 to the fifth simulated gear 210A5. The automatic shift curve 250A illustrates the engine speed as the vehicle speed increases, and hybrid vehicle 100 automatically upshifts. For example, as the hybrid vehicle 100 accelerates from a standstill (0 kph), the engine speed increases along the first simulated gear 210A1. When hybrid vehicle 100 reaches the first simulated shift point 220A1, the engine speed is reduced, following the second simulated gear 210A2. Similarly, the engine speed increases and is then reduced at the second simulated shift point 220A2, the third simulated shift point 220A3, and the fourth simulated shift point 220A4. Similarly, as the hybrid vehicle 100 decelerates from a higher speed, such as 100 kph, the engine speed decreases along the fifth simulated gear 210A5. When the hybrid vehicle 100 reaches the simulated shift point 220A4 and the driver applies enough brake pressure to activate an automatic downshift, the engine speed is increased, following the fourth simulated gear 210A4, and further downshifts as the vehicle speed is reduced. These changes in engine speed are similar to the changes in engine speed exhibited by a vehicle with a step transmission.

The changes in engine speed simulate a shifting experience for the driver. The driver would be accustomed to changes in engine noise corresponding to the changes in engine speed. For example, the engine noise created by running the engine at the speeds along automatic shift curve 250A is similar to shifting a vehicle with a step transmission. Higher engine speeds produce louder engine noise. Drivers may associate louder engine noise with more aggressive performance and power.

The deceleration torque map 200B in FIG. 2B illustrates the deceleration torque for each simulated gear along the y axis in Newton-meters (Nm) versus the vehicle speed along the x axis in kph. The shift points are also shown, indicating which simulated gears are available at each vehicle speed and their corresponding deceleration torque amounts. For example, as the hybrid vehicle 100 decelerates from 80 kph in fourth gear, it will follow the fourth gear deceleration torque amount 210B4 until the vehicle speed crosses the shift point 220B3 at around 70 kph. After the vehicle speed becomes less than 70 kph, if the driver applies brake pressure that causes the requested deceleration torque to cross the third gear deceleration torque amount 210B3, the hybrid vehicle 100 can automatically downshift to third gear. The hybrid vehicle 100 will then follow the third gear deceleration torque amount 210B3 when the brake pedal is released.

Figure 3:
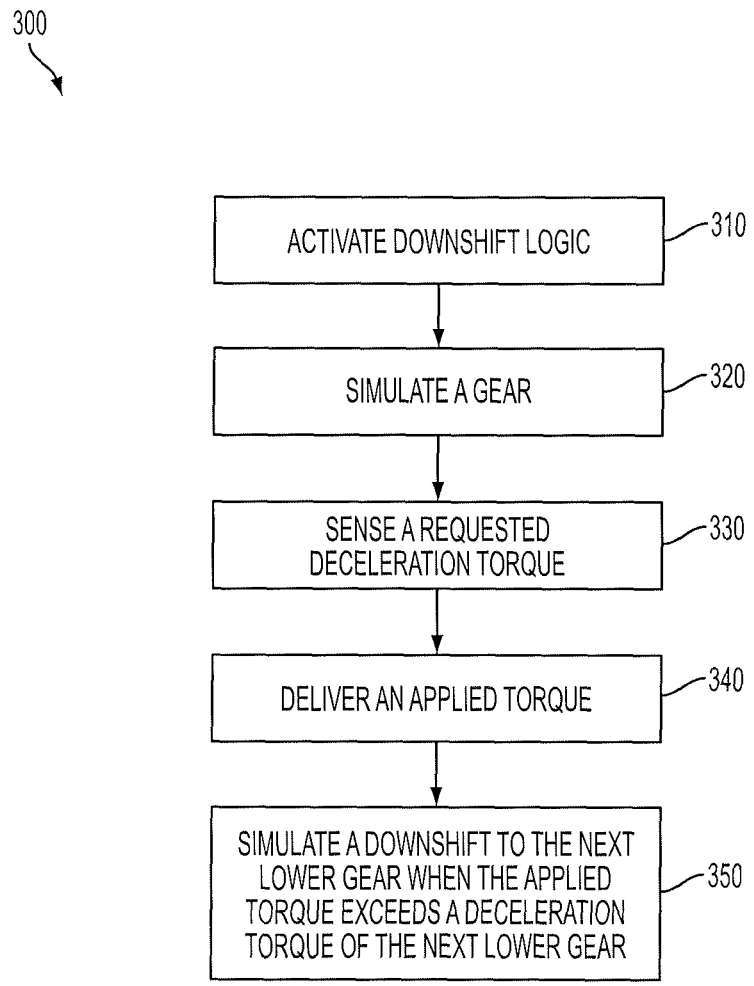
FIG. 3 is a flow chart illustrating a process of simulating downshifting a hybrid vehicle according to an implementation of the present application.

FIG. 3 presents flowchart 300 of one implementation of the automatic downshift logic of processor 150. At 310, the downshift logic is activated. The driver of hybrid vehicle 100 may manually activate the downshift logic by, for example, pushing a button to enter a sporty driving mode. At 320, the hybrid vehicle 100 simulates a gear. A gear is simulated by producing an appropriate engine speed for the vehicle's current speed. At 330, the processor 150 senses a requested deceleration torque. Brake pedal sensor 140 detects the pressure applied to the brake pedal 130, which corresponds to the requested deceleration torque. At 340, the transmission 120 delivers an applied torque to the wheels 170. The applied torque correlates with the requested deceleration torque, as will be discussed further below. At 350, the processor 150 simulates a downshift to the next lower gear when the applied torque exceeds a deceleration torque of the next lower gear. 350 may be repeated for each successive lower gear such that simulated gears are not skipped.

Figure 4:
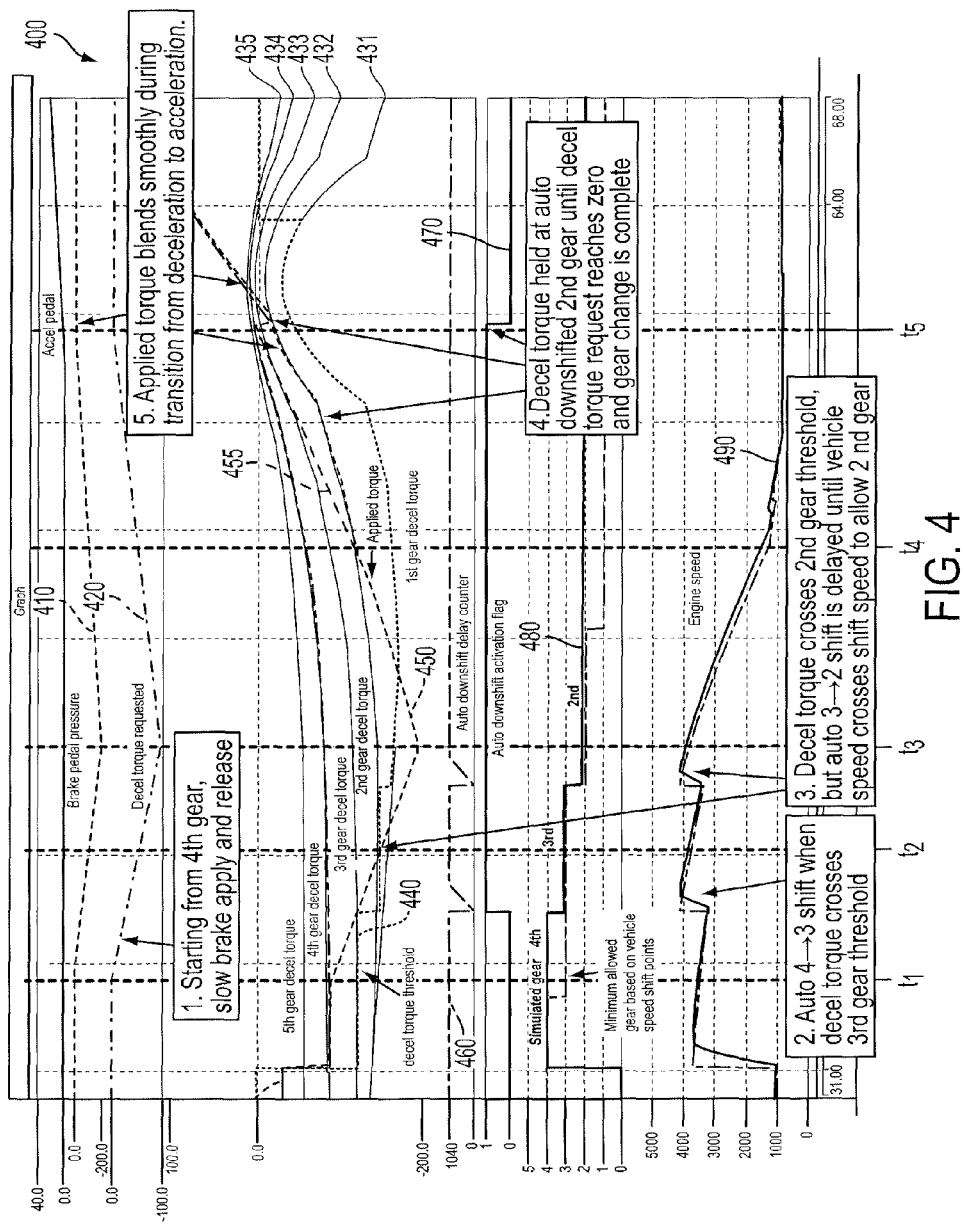
FIG. 4 is a graph illustrating simulation data for the downshift logic during a slow brake apply and release according to an implementation of the present application.

FIG. 4 illustrates simulation data for the automatic downshift logic during a slow brake apply and release. In graph 400, the hybrid vehicle 100 starts from the fourth gear, when the brake pedal 130 is slowly applied and released. The brake pedal pressure curve 410 shows a gradual application of pressure on the downslope, and a subsequent gradual release of the pressure on the upslope. The requested deceleration torque curve 420 resembles the brake pedal pressure curve 410. The requested deceleration torque may be directly proportional to the brake pedal pressure. Alternatively, the requested deceleration torque may correspond to the actual deceleration of the hybrid vehicle 100. The accelerometer 184 may detect the actual deceleration in order to determine the requested deceleration torque. In another implementation, the actual deceleration and the brake pedal pressure may be used in conjunction to determine the requested deceleration torque.

The applied torque curve 450 illustrates the torque that is actually applied to the wheels 170 by the transmission 120. As seen in FIG. 4, the applied torque curve 450 is generally proportional to the requested deceleration torque curve 420 while there is pressure applied to the brake pedal 130. The roughly parallel deceleration torque curves 431-435 illustrate the deceleration torque curves associated with respective simulated gears. First gear deceleration torque curve 431, second gear deceleration torque curve 432, third gear deceleration torque curve 433, fourth gear deceleration torque curve 434, and fifth gear deceleration torque curve 435 depict the torque that would be applied to simulate the respective gears during normal deceleration. The deceleration torque threshold curve 440 illustrates the thresholds at which the deceleration torque should follow the next lower gear.

The automatic downshift delay counter curve 460 illustrates the time since the last automatic downshift was triggered. The automatic downshift activation flag curve 470 depicts when the automatic downshift logic sequence is engaged. The simulated gear curve 480 illustrates the current simulated gear during the automatic downshifts. The engine speed curve 490 shows the engine speed as the vehicle automatically downshifts.

In FIG. 4, the vehicle starts in fourth gear, as seen in simulated gear curve 480. While in the fourth gear, the applied torque curve 450 follows the fourth gear deceleration torque. The engine speed curve 490 gradually decreases in conjunction with normal deceleration in fourth gear.

When pressure is applied to the brake pedal 130 at time $t_1$, indicated by the change in the brake pedal pressure curve 410, the requested deceleration torque curve 420 accordingly changes. The applied torque 450 likewise changes, as the deceleration increases due to braking. The requested deceleration torque and corresponding applied torque serve as a precondition to automatic downshifting. Otherwise, the vehicle would follow the fourth gear deceleration torque. For example, if the brake pedal sensor 140 and/or the accelerometer 184 indicate there is no requested deceleration torque, the hybrid vehicle 100 will not initiate an automatic downshift.

An automatic downshift is triggered when the applied torque curve crosses the third gear deceleration torque threshold. At that time, the automatic downshift delay counter curve 460 is reset to 0 and begins counting back up, indicating the time since the automatic downshift occurred. The automatic downshift activation flag curve 470 indicates that the automatic downshift logic sequence has been activated. The simulated gear curve 480 indicates the downshift to the third gear.

Finally, the engine flares as its engine speed is increased to simulate a downshift. Although the driver may not feel any difference in actual deceleration, because the applied torque curve 450 remains linear and unaffected by the downshift, the driver's experience is enhanced by the audible cue of increased engine noise. The noise from the increased engine speed gives the driver the impression of downshifting, while maintaining the smooth torque delivery.

As the requested deceleration torque curve 420 increases in magnitude, the applied torque curve 450 crosses the second gear deceleration torque threshold at time $t_2$. However, the automatic downshift to second gear does not occur until the vehicle speed becomes low enough to cross the shift point to allow second gear. Once the vehicle speed becomes low enough to allow second gear, the automatic downshift delay counter curve 460, simulated gear curve 480, and engine speed curve 490 indicate the downshift to second gear. The automatic downshift logic sequence remains activated, as shown by automatic downshift activation flag curve 470.

At time $t_3$, the pressure on the brake pedal is slowly released. As less deceleration torque is requested, the vehicle remains in second gear. The applied torque is held at the second gear deceleration torque amount as the requested deceleration torque is further reduced. At time $t_4$, the applied torque curve 450 gradually follows the second gear deceleration torque curve 432 instead of returning to the original fourth gear deceleration torque amount. This avoids a step-change in the applied torque changing from the original gear deceleration torque amount to the automatically downshifted lower gear deceleration torque amount and smoothly blends the applied torque as the brake pedal is fully released and the driver begins to accelerate.

Without this blending, the applied torque curve 450 would follow torque curve 455 because the applied torque to the wheels 170 is decoupled from the automatically downshifted gear during the braking event. At time $t_5$, the brake pedal is completely released, as indicated by the brake pedal pressure curve 410 returning to 0. As the hybrid vehicle 100 starts to accelerate, the engine speed corresponds to the second simulated gear. However, the torque curve 455 follows a curve similar to the requested deceleration torque curve 420, resulting in torque curve 455 veering away from the second gear deceleration torque curve 432. The torque curve 455 must step down to the second gear deceleration torque curve 432 to match with the engine speed. This step down may cause a noticeable stutter to the driver. Smoothly blending the applied torque curve 450 with the second gear deceleration torque 432 prevents this step-change. When the requested deceleration torque curve 420 returns to 0 at time $t_5$, the simulated gear shift is complete. The automatic downshift activation flag curve 470 shows that the automatic downshift logic sequence is completed.

Figure 5:
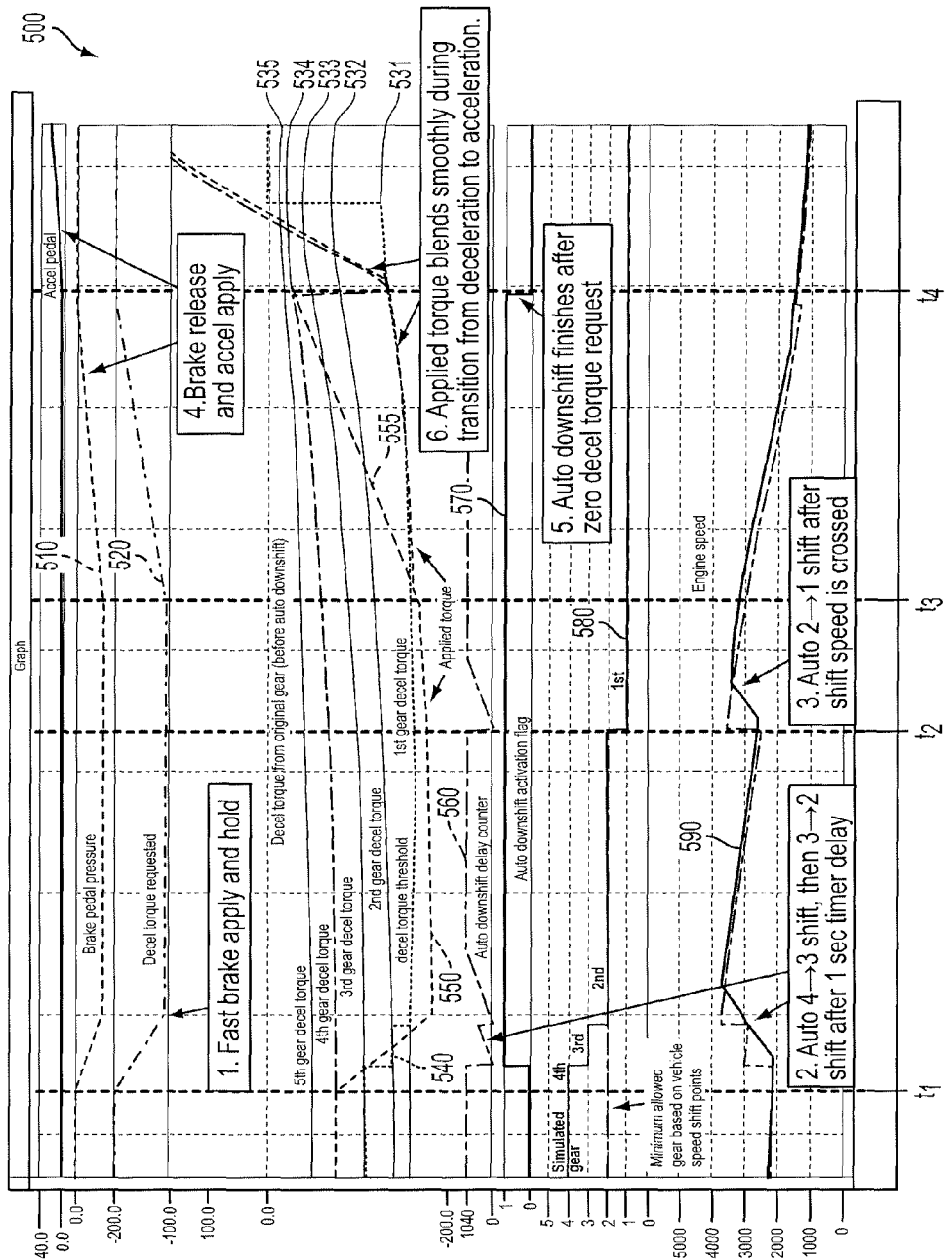
FIG. 5 is a graph illustrating simulation data for the downshift logic during a fast brake apply and release according to an implementation of the present application.

FIG. 5 illustrates simulation data for the automatic downshift logic during a fast brake apply, hold, and then release. In graph 500, the hybrid vehicle 100 starts in fourth gear, as illustrated by simulated gear curve 580. At time $t_1$, a fast brake is applied and held. The fast brake activates the automatic downshift logic sequence, as indicated by automatic downshift activation flag curve 570. The fast brake causes a relatively sharper downslope of the requested deceleration torque curve 520, which in turn causes a sharper downslope of the applied torque curve 550. The applied torque curve 550 crosses the third gear deceleration torque threshold and the second gear deceleration torque threshold.

Rather than skipping the third gear to downshift from the fourth gear to the second gear, a delay is added between consecutive downshifts. Because the downshifts are simulated, a delay is necessary to distinguish multiple downshifts between consecutive gears. For example, a one second timer delay may be added in order to allow a downshift to the third gear before a downshift to the second gear. The delay allows the engine speed to increase for each downshift, as shown by the staggered increase in the engine speed curve 590. The simulated gear curve 580 and the automatic downshift delay counter curve 560 further depict two consecutive downshifts as opposed to a single downshift.

At time $t_2$, because the brake is still held, the vehicle speed reduces and crosses the shift point to allow first gear. The automatic downshift delay counter curve 560, simulated gear curve 580, and engine speed curve 590 appropriately indicate the downshift to first gear.

Once in the lowest or first gear, the brake begins to be released. Similar to the example from FIG. 4 described above, at time $t_3$ the applied torque amount is held at the first gear deceleration torque amount as the requested deceleration torque curve 520 is reduced. Following torque curve 555, which has a similar shape with the requested deceleration torque curve 520, results in a large step down when the brake pedal 130 is released and the accelerator is applied. Smoothly blending the applied torque curve 550 with the first gear deceleration torque curve 531 avoids this step-change. The automatic downshift is completed when the requested deceleration torque curve 520 reaches 0 at time $t_4$, and the applied torque curve 550 is smoothly blended as the hybrid vehicle 100 begins to accelerate.

Figure 6:
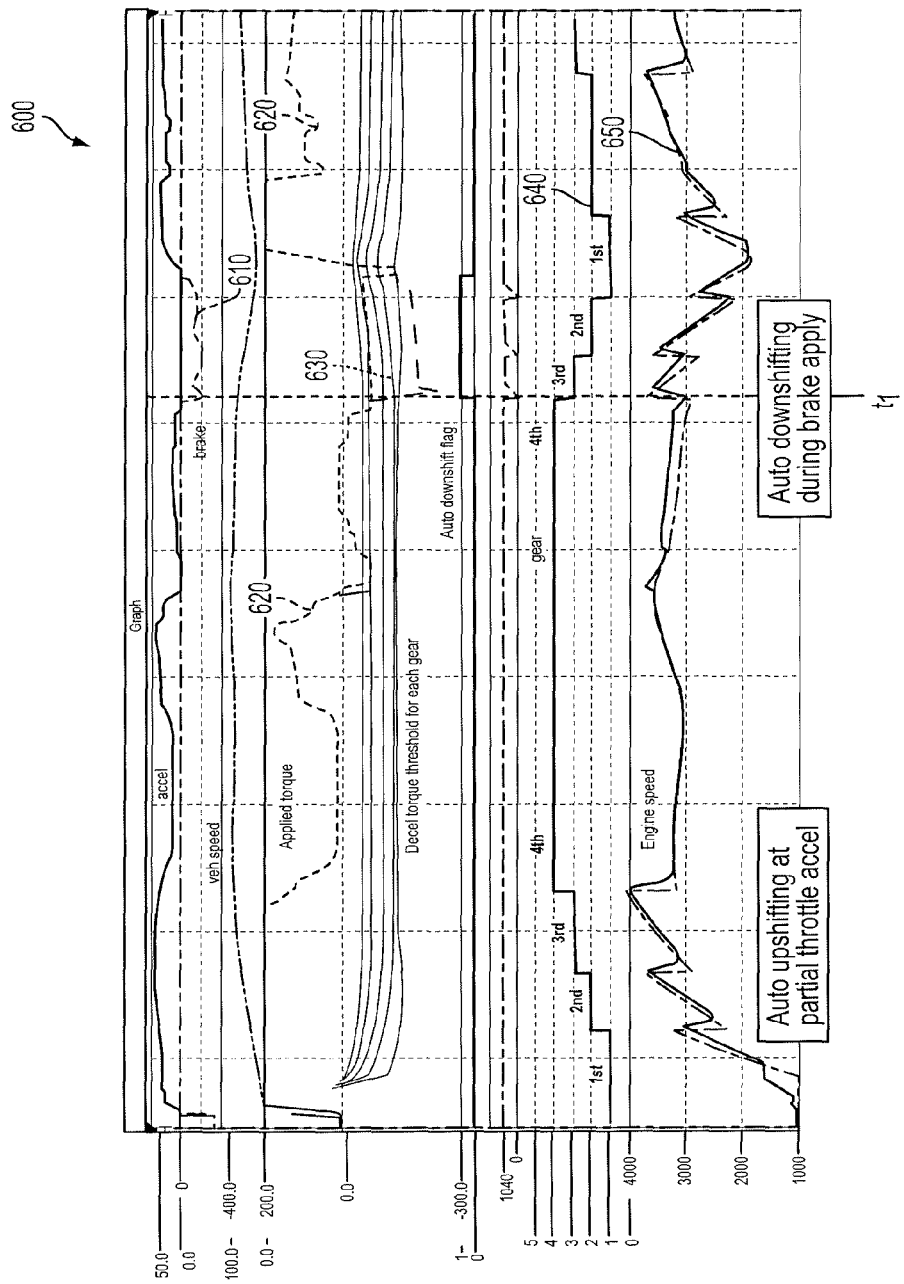
FIG. 6 is a graph illustrating actual vehicle driving data with simulated shifts according to an implementation of the present application.

FIG. 6 presents actual vehicle driving data in graph 600. Graph 600 depicts acceleration data until time $t_1$. At time $t_1$, the pedal pressure curve 610 indicates the brake pedal being applied. Applied torque curve 620 shows the sudden drop in torque, which triggers an automatic downshift. The automatic downshift can be seen in simulated gear curve 640 shifting down to third gear from fourth gear. The automatic downshifts also cause spikes in the engine speed curve 650, resulting in loud engine noise associated with sporty and aggressive performance. The automatic downshifting may further keep the engine speed high for a good response during re-acceleration, especially for driving on winding roads. Moreover, the hybrid vehicle control can keep smooth applied torque while shifting through the simulated gears, which is advantageous over conventional step transmission vehicles.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. A system for simulated shifting for a hybrid vehicle comprising:
    a plurality of wheels;
    an engine for providing a torque to the plurality of wheels;
    a sensor configured to detect braking applied by a driver;
    a transmission coupled to the engine and the plurality of wheels and configured to simulate a current simulated gear and deliver an applied torque to the plurality of wheels, the applied torque being based on a requested deceleration torque that corresponds to the applied braking detected by the sensor;
    a memory for storing a deceleration torque for each of a plurality of simulated gears; and
    a processor coupled to the engine, the sensor, the transmission, and the memory, the processor configured to:
    increase an engine speed of the engine when the requested deceleration torque exceeds a deceleration torque of a lower simulated gear, and
    blend the applied torque with the deceleration torque for a simulated gear of the plurality of simulated gears when or after the applied braking is decreased or no longer applied, for smoothly completing a shifting of the transmission when the hybrid vehicle transitions from deceleration to acceleration.

2. The system of claim 1,
    wherein the memory further stores a target engine speed for each of the plurality of simulated gears, and
    wherein the processor is further configured to simulate a downshift for each simulated gear lower than the current simulated gear having a deceleration torque exceeded by the requested deceleration torque, and increase the engine speed of the engine based on the target engine speed corresponding to the current simulated gear.

3. The system of claim 2, wherein the processor is further configured to add a delay between consecutive simulated downshifts.

4. The system of claim 1, wherein the processor is further configured to blend the applied torque with the deceleration torque of the lower simulated gear when the requested deceleration torque is reduced.

5. The system of claim 1, wherein the sensor comprises an accelerometer sensor configured to detect an actual deceleration of the hybrid vehicle to correspond to the requested deceleration torque.

6. The system of claim 1, wherein the sensor is a brake pedal sensor configured to detect a requested brake pressure to correspond to the requested deceleration torque.

7. The system of claim 1 further comprising a paddle shifter configured to override the processor to simulate shifting.

8. A hybrid vehicle comprising:
    a plurality of wheels;
    an engine for providing a torque to the plurality of wheels;
    a brake pedal sensor configured to detect a pressure being applied to a brake pedal, the pressure being applied to the brake pedal corresponding to a requested deceleration torque;
    a transmission coupled to the engine and the plurality of wheels and configured to simulate a current simulated gear and deliver an applied torque to the plurality of wheels, the applied torque corresponding to the requested deceleration torque;
    a memory for storing a target engine speed and a deceleration torque for each of a plurality of simulated gears;
    a processor coupled to the engine, the brake pedal sensor, the transmission, and the memory, the processor configured to:
    simulate a downshift for each simulated gear lower than the current simulated gear having a deceleration torque exceeded by the requested deceleration torque, and
    blend the applied torque with the deceleration torque for a simulated gear of the plurality of simulated gears when or after the applied pressure is decreased or no longer applied, for smoothly completing a shifting of the transmission when the hybrid vehicle transitions from deceleration to acceleration; and
    a paddle shifter configured for manual simulated shifting.

9. The hybrid vehicle of claim 8, wherein simulating a downshift comprises increasing an engine speed of the engine without changing the applied torque to the plurality of wheels.

10. The hybrid vehicle of claim 8, wherein the processor is further configured to add a delay between consecutive simulated downshifts.

11. The hybrid vehicle of claim 8, wherein the processor is further configured to blend the applied torque with the deceleration torque of a simulated gear when the pressure is released from the brake pedal.

12. The hybrid vehicle of claim 8, further comprising an accelerometer sensor configured to detect an actual deceleration of the hybrid vehicle, wherein the actual deceleration corresponds to the requested deceleration torque.

13. The hybrid vehicle of claim 8, wherein the paddle shifter is further configured to override the processor to simulate shifting.

14. A method for simulating shifting for a hybrid vehicle comprising:
    simulating a current simulated gear;
    sensing braking applied by a driver;
    delivering an applied torque being based on a requested deceleration torque that corresponds to the applied braking;
    increasing an engine speed without changing the applied torque when the requested deceleration torque exceeds a deceleration torque of a lower simulated gear; and
    blending the applied torque with the deceleration torque for a simulated gear of the plurality of simulated gears when or after the applied braking is decreased or no longer applied, for smoothly completing a shifting of the transmission when the hybrid vehicle transitions from deceleration to acceleration.

15. The method of claim 14, wherein the requested deceleration torque corresponds to a pressure applied to a brake pedal.

16. The method of claim 15, wherein the applied torque is blended to a deceleration torque of the lower simulated gear when the brake pedal is released.

17. The method of claim 14, wherein increasing the engine speed without changing the applied torque further comprises increasing the engine speed without changing the applied torque for each simulated gear lower than the current simulated gear having a deceleration torque exceeded by the requested deceleration torque.

18. The method of claim 17, wherein increasing the engine speed without changing the applied torque further comprises adding a delay between each consecutive increase in the engine speed for each simulated gear.

19. The method of claim 14, wherein increasing the engine speed without changing the applied torque further comprises generating an engine sound.

20. The method of claim 14, wherein the engine speed is controlled independently from a vehicle speed of the hybrid vehicle.

* * * * *